United States Patent [19]

Sakanaka et al.

[11] 4,234,704

[45] Nov. 18, 1980

[54] CHLOROPRENE POLYMER COMPOSITION

[75] Inventors: Yasuhiro Sakanaka; Mamoru Narui, both of Shin-Nanyo, Japan

[73] Assignee: Toyo Soda Manufacturing Company, Limited, Yamaguchi, Japan

[21] Appl. No.: 48,382

[22] Filed: Jun. 14, 1979

[30] Foreign Application Priority Data

Sep. 18, 1978 [JP] Japan ................................ 53/113671

[51] Int. Cl.³ .............................................. C08L 11/00
[52] U.S. Cl. ................................ 525/215; 260/29.7 D; 526/295
[58] Field of Search ......................... 525/215; 526/295; 260/29.7 D

[56] References Cited

U.S. PATENT DOCUMENTS

| | | | |
|---|---|---|---|
| 3,042,652 | 7/1962 | Pariser et al. | 525/215 |
| 3,147,317 | 9/1964 | Jungk et al. | 525/215 |
| 3,147,318 | 9/1964 | Jungk | 525/215 |
| 3,655,827 | 4/1972 | Finlay et al. | 525/215 |
| 3,838,140 | 9/1974 | Mayer-Mader et al. | 526/295 |
| 3,849,519 | 11/1974 | Kadowaki et al. | 525/215 |
| 3,876,732 | 4/1975 | Kitagawa et al. | 525/215 |
| 3,904,576 | 9/1975 | Fogg et al. | 525/215 |
| 3,932,355 | 1/1976 | Barney et al. | 526/295 |
| 3,937,659 | 2/1976 | Boldt et al. | 525/215 |
| 4,035,446 | 7/1977 | Hoff | 525/215 |

*Primary Examiner*—Harry Wong, Jr.
*Attorney, Agent, or Firm*—Oblon, Fisher, Spivak, McClelland & Maier

[57] ABSTRACT

A chloroprene polymer composition comprises a benzene soluble chloroprene polymer (A) and a gel chloroprene polymer (B) at a ratio ranging from 20:1 to 1:1, wherein the benzene soluble chloroprene polymer (A) is obtained by an aqueous emulsion polymerization of chloroprene or a mixture of chloroprene and a comonomer with 0.05 to 5.0 wt. % of a molecular weight regulator in which the polymerization in the presence of effective amount of the molecular weight regulator is carried out to reach a conversion of 40 to 60% and then, 40 to 70 wt. % of the molecular weight regulator incorporated at the initiation of the polymerization is incorporated and the polymerization is continued to give a conversion of higher than 80% and the gel chloroprene polymer (B) is obtained by an aqueous emulsion polymerization of chloroprene or a mixture of chloroprene and a polyfunctional monomer.

10 Claims, No Drawings

CHLOROPRENE POLYMER COMPOSITION

BACKGROUND OF THE INVENTION

1. Field of the Invention

The present invention relates to a chloroprene polymer composition having excellent extrusion processability, tensile strength, flexural strength and thermal stability.

2. Description of the Prior Arts

It has been proposed to blend a solvent soluble chloroprene (hereinafter referring to as sol chloroprene polymer) to a highly crosslinked gel chloroprene polymer in order to improve extrusion processability of chloroprene polymer. However, the physical properties of such compositions have not been satisfactory. That is, in the conventional process, when a content of the gel chloroprene polymer is high, the extrusion velocity can be increased and the an extrusion expansion (die swell) can be minimized in the extrusion processability. However, the precise shaping in its molding and the smoothness of the surface are inferior and the mechanical strength and the storage stability are remarkably inferior.

In order to overcome such disadvantages, it has been proposed to reduce the content of the gel chloroprene polymer or to incorporate a softening agent or a liquid chloroprene polymer prepared with large amounts of molecular weight modifier. However, in the former method, the extrusion processability as the basical characteristic is inferior whereas in the later method, the fluidity and the surface smoothness of the extruded product are improved, but the dimentional stability and the mechanical strength are inferior. It has been difficult to impart satisfactory extrusion processability, mechanical strength and thermal stability.

Various studies have been worked in order to improve the mechanical strength of chloroprene polymer composition for extrusion molding. For example, a method of incorporating a sol chloroprene polymer prepared by using a sulfur containing compound as a molecular weight regulator has been proposed (Japanese patent publication Nos. 16049/1973 and 53441/1975.) However, in such method, the content of the gel chloroprene polymer should be lowered from the required content in order to maintain the mechanical strength of the gel chloroprene polymer composition. The surface smoothness and the die swell among the extrusion processability have been unsatisfactory. Such chloroprene polymer compositions have the disadvantage of remarkably inferior thermal stability. It has been difficult to impart satisfactory extrusion processability, mechanical strength and thermal stability. It has not been found what kinds of a gel chloroprene polymer and a sol chloroprene polymer are suitable for imparting these desired characteristics.

SUMMARY OF THE INVENTION

It is an object of the present invention to provide a uniform composition of a sol chloroprene polymer and a gel chloroprene polymer and a gel chloroprene polymer which has satisfactory characteristics such as extrusion processability, mechanical strength and thermal stability.

The foregoing and other objects of the present invention have been attained by providing a chloroprene polymer composition comprising a benzene soluble chloroprene polymer (A) obtained by an aqueous emulsion polymerization of chloroprene or a mixture of chloroprene and a comonomer with 0.05 to 5.0 wt.% of a molecular weight regulator wherein the polymerization in the presence of effective amount of the molecular weight regulator for preventing a formation of a gel is carried out to reach a conversion of 40 to 60% and then, 40 to 70 wt.% of the molecular weight regulator incorporated at the initiation of the polymerization, is incorporated and the polymerization is continued to give a conversion of higher than 80%, and a gel chloroprene polymer (B) obtained by an aqueous emulsion polymerization of chloroprene or a mixture of chloroprene and a polyfunctional monomer, at a ratio of the benzene soluble chloroprene polymer (A): the gel chloroprene polymer (B) ranging from 20:1 to 1:1.

DETAILED DESCRIPTION OF THE PREFERRED EMBODIMENTS

The chloroprene polymer composition of the present invention has superior extrusion processability, mechanical strength and thermal stability to those of a composition of a gel chloroprene polymer and a sol chloroprene polymer obtained by adding a molecular weight regulator before the initiation of the polymerization and producing at a conversion of about 70%.

A method of adding a molecular weight regulator in sequence in the preparation of a sol chloroprene polymer has been known as the increment method. The effect of the increment method is to reduce an amount of the molecular weight regulator and to give narrow molecular weight distribution and to reduce a gel and a crosslinking. The main purpose of the increment method is to reduce the amount of the molecular weight regulator. For example, less than ⅔ of the amount of the molecular weight regulation incorporated in the conventional process, is added before the initiation of the polymerization and less than ⅓ of the amount of the molecular weight regulator incorporated in the conventional process is added during the polymerization.

However, the increment method also has the disadvantage that when the conversion is higher than 80%, the crosslinking or the gel is easily formed and the physical properties of the polymer are inferior to those of the conventional polymers.

It has been considered to be difficult to impart satisfactory extrusion processability, thermal stability and mechanical strength for the composition of a gel chloroprene polymer and a sol chloroprene polymer obtained at high conversion. That is, it has not been considered to impart satisfactory physical properties for a uniform composition of the gel chloroprene polymer and the sol chloroprene polymer obtained by the process of the present invention.

In the process of the present invention, it is important to use the molecular weight regulator at a relatively higher ratio than the ratio of the molecular weight regulator used in the conventional sol chloroprene polymer. That is, in the conventional process for producing the sol chloroprene polymer having a molecular weight of about 300,000 at a conversion of 70%, it is necessary to incorporate about 0.20 wt.% of n-dodecyl mercaptan to chloroprene at the initiation of the polymerization. Thus, in the process of the present invention, the molecular weight regulator such as n-dodecyl mercaptan is further added at a ratio of 40 to 70 wt.% of the initial amount of the molecular weight regulator during the polymerization at a conversion of 40 to 60%.

The conversion, the ratio of the additional molecular weight regulator and the times for the additions are fundamental conditions for attaining the object of the present invention. The effect of the present invention can not be expected when the fundamental conditions are not given.

In the preparation of the sol chloroprene polymer of the present invention, chloroprene or a mixture of chloroprene and a comonomer is used as a starting material. Suitable comonomers include 2,3-dichloro-1,3-butadiene, 2-cyano-1,3-butadiene, 1-chloro-1,3-butadiene, styrene, acrylonitrile, and methyl methacrylate.

The comonomer can be incorporated at a ratio of 1 to 20 wt.% based on total monomers.

Suitable molecular weight regulators include higher aliphatic primary, secondary or tertiary mercaptan having a $C_5$–$C_{16}$ alkyl group, and alkyl xanthogen disulfides having a $C_1$–$C_8$ alkyl group. The optimum molecular weight regulators include n-octyl mercaptan, n-dodecyl mercaptan, tertiary dodecyl mercaptan, diethyl xanthogendisulfide, dipropyl xanthogendisulfide etc. The molecular weight regulator is used at a ratio ranging from 0.05 to 5.0 wt.% based on the monomers. If necessary, the molecular weight regulator can be used by dissolving it in a solvent such as $C_5$–$C_{10}$ aliphatic or aromatic hydrocarbons and $C_2$–$C_{10}$ alcohols or glycohols.

The polymerization can be carried out by the conventional process. An aqueous emulsion of the monomer containing a specific amount of the molecular weight regulator and an emulsifier is stirred at a temperature of 5° to 70° C. at pH of 7 to 13, and a catalyst is incorporated.

Suitable emulsifiers include anionic surface active agents such as water soluble salts especially alkali metal salts of higher aliphatic acids, resin acids, disproportionation abietic acid, long chain alkylsulfonic acid and naphthalenesulfonic acid and formaldehyde condensates; and nonionic surface active agents such as polyoxyethylene nonylphenol ethers.

Suitable catalysts for the initiation of the polymerization include potassium persulfate, hydrogen peroxide, t-butyl hydroperoxide etc.

The polymerization is initiated by incorporating the effective amount of the molecular weight regulator in the monomer. When a conversion reaches to 40 to 60%, the molecular weight regulator at a ratio of 40 to 70 wt.% of the initially added amount of the molecular weight regulator, in the polymerization system and the polymerization is continued to reach 80 to 90%, and the polymerization is stopped by adding a polymerization inhibitor.

Suitable polymerization inhibitors include thiodiphenylamine, 4-t-butyl catechol, 2,2'-methylene-bis-4-methyl-6-t-butyl phenol, alkylated diphenylamine etc. The polymerization inhibitor is added at a ratio of 0.01 to 2.0 wt.%.

The resulting polymer latex is treated by the conventional method such as steam stripping method to remove the unreacted monomer and then, it is blended to the gel latex.

The gel chloroprene polymer can be obtained by an aqueous emulsion polymerization of chloroprene or a mixture of chloroprene and a polyfunctional comonomer with an emulsifier by stirring them at a temperature of 5° to 70° C. at pH of 7 to 13.

Suitable polyfunctional comonomers include ethyleneglycol dimethacrylate, diethyleneglycol dimethacrylate, trimethylolpropane trimethacrylate etc. The polyfunctional comonomer is usually used at a ratio ranging from 0.1 to 10 wt.%.

The polymerization can be carried out by the same process for the preparation of the sol chloroprene polymer except adding the additional molecular weight regulator. The conversion is preferably 80 to 98%.

The unreacted monomers are removed from the resulting polymer latex. The product latex is mixed with the sol chloroprene polymer latex at a ratio ranging from 20:1 to 1:1 of the sol chloroprene polymer; the gel chloroprene polymer and the mixture is uniformly mixed and the polymers are separated and dried by the conventional method to obtain a gel/sol chloroprene polymer composition.

The present invention will be further illustrated by certain examples and references which are provided for purposes of illustration only and are not intended to be limiting the present invention. In the examples, the terms of part and % respectively mean part by weight and % by weight otherwise specified.

EXAMPLE 1

(A) Preparation of sol chloroprene polymer

In a 50 liter autoclave equipped with a stirrer which was purged with nitrogen gas, the following monomer solution and the emulsifier solution were charged and the mixture was stirred at 40° C. (20 kg of the total monomer was charged).

| Monomer solution: | |
|---|---|
| Chloroprene | 100 wt. parts |
| 2,6-Di-t-butyl p-cresol | 0.01 wt. part |
| n-Dodecyl mercaptan | 0.22 wt. part |
| Emulsifier solution: | |
| Sodium abietate (disproportionation) | 4.0 wt. parts |
| Sodium formaldehyde-naphthalene-sulfonate condensate | 0.7 wt. part |
| Sodium hydroxide | 0.2 wt. part |
| Water | 100 wt. parts |

The following initiation activator solution was added.

| Sodium hydrosulfite | 0.015 wt. part |
|---|---|
| Water | 0.6 wt. part |

The following polymerization catalyst solution was added by a pump at a constant rate to continue the polymerization.

| Potassium persulfate | 0.5 wt. part |
|---|---|
| Sodium anthraquinone β-sulfonate | 0.15 wt. part |
| Water | 100 wt. parts |

When the specific gravity of the latex reached to 1.045 at 40° C. (conversion of 54.3%), 0.11 wt.part of n-dodecyl mercaptan was added to the polymerization system and the polymerization was continued to reach the specific gravity of the latex to 1.082 (conversion of 82.4%). The following polymerization inhibitor solution was added to stop the polymerization.

| p-t-Butyl catechol | 0.01 wt. part |
|---|---|
| Thiodiphenylamine | 0.01 wt. part |
| Toluene | 0.8 wt. part |

-continued

| | |
|---|---|
| Sodium dodecylbenzenesulfonate | 0.02 wt. part |
| Sodium formaldehyde-naphthalene-Sulfonate condensate | 0.01 wt. part |
| Water | 0.80 wt. part |

After the polymerization, the unreacted monomer was removed and recovered by the steam stripping method to obtain a sol chloroprene polymer latex. The result is shown in Table 1.

(B) Preparation of gel chloroprene polymer

In an autoclave, the following monomer solution and the emulsifier solution were charged and the mixture was stirred at 40° C.

| Monomer solution | |
|---|---|
| Chloroprene | 98 wt. parts |
| Trimethylolpropane trimethacrylate | 2 wt. parts |
| n-Dodecyl mercaptan | 0.20 wt. part |
| 2,6-Di-t-butyl p-cresol | 0.01 wt. part |
| Emulsifier solution: | |
| Sodium abietate (disproportionation) | 4.0 wt. parts |
| Sodium formaldehyde-naphthalene-sulfonate condensate | 0.7 wt. part |
| Sodium hydroxide | 0.20 wt. part |
| Water | 120 wt. parts |

The following polymerization catalyst solution was added by a pump at a constant rate to initiate the polymerization.

| | |
|---|---|
| Potassium persulfate | 0.5 wt. part |
| Sodium anthraquinone β-sulfonate | 0.1 wt. part |
| Water | 100 wt. parts |

The polymerization was continued to reach a specific gravity of the latex to 1.090 at 40° C. (conversion of 92.0%) by feeding the polymerization catalyst solution and then, the following polymerization inhibitor solution was added to stop the polymerization.

| | |
|---|---|
| p-t-Butyl catechol | 0.01 wt. part |
| Thiodiphenylamine | 0.01 wt. part |
| Toluene | 0.80 wt. part |
| Sodium dodecylbenzenesulfonate | 0.02 wt. part |
| Sodium formaldehyde-naphthalene-sulfonate condensate | 0.01 wt. part |
| Water | 0.80 wt. part |

After the polymerization, the unreacted monomer was removed and recovered by the steam stripping method from the latex to obtain a gel chloroprene polymer latex. The result is shown in Table 1.

(C) Preparation of composition of gel/sol chloroprene polymers

The latexes obtained in the steps (A), (B) were uniformly mixed at a ratio of 75:25 of the sol chloroprene polymer: the gel chloroprene polymer. The pH of the mixture was adjusted to 6.0 with acetic acid. The mixture was treated by the conventional freezing, separating and drying steps to obtain a gel/sol chloroprene polymer composition.

The gel/sol chloroprene polymer was kept in a Gear oven at 100° C. for an accelerated deterioration. After seven days, the storage stability was examined by measuring Mooney viscosity by Japanese Industrial Standard K-6300. Then, the physical properties were measured by blending 100 wt.parts of the polymer composition, 4 wt.parts of magnesia, 1 wt.part of stearic acid, 29 wt.parts of SRF carbon and 5 wt.parts of zinc oxide on a roller mill and fabricating a sheet. The extrusion test was carried out by a Brabender extrusion tester by ASTM D-2230-63T (cylinder temperature: 70° C.; head temperature: 100° C.; rotary speed: 50 rpm).

The mixture was further admixed with 0.5 wt.part of Accelerator-22 (ethylenethiourea) and a vulcanization was carried out at 150° C. for 20 minutes to prepare a vulcanized product and the tensile strength and the flexural strength were measured by Japanese Industrial Standard 6301. The result is shown in Table 2.

EXAMPLE 2

In accordance with the process of Example 1 except using the following monomer solution, a sol chloroprene polymer was produced.

| Monomer solution: | |
|---|---|
| Chloroprene | 92 wt. parts |
| 2,3-Dichlorobutane | 8 wt. parts |
| n-Dodecyl mercaptan | 0.230 wt. part |
| 2,6-Di-t-butyl p-cresol | 0.0 wt. part |

The resulting polymer latex was blended to the gel chloroprene polymer latex and the mixture was treated by the process of Example 1 to obtain a gel/sol chloroprene polymer composition.

In accordance with the method of Example 1, the physical characteristics of the composition and the vulcanized product were measured. The results are shown in Tables 1 and 2.

EXAMPLE 3

In accordance with the process of Example 1 except using the following monomer solution, a sol chloroprene polymer was produced.

| Monomer solution: | |
|---|---|
| Chloroprene | 100 wt. parts |
| 2,6-Di-t-butyl-p-cresol | 0.01 wt. part |
| Diethyl xyanthogendisulfide | 0.45 wt. part |

When the specific gravity of the latex reached to 1.042 (conversion of 56.8%), the following molecular weight regulator was added and the polymerization was continued to reach the specific gravity of the latex to 1.082 (polymerization conversion of 83.5%) and the polymerization was stopped as the same as the method of Example 1.

| Molecular weight regulator solution: | |
|---|---|
| Diethyl xanthogendisulfide | 0.225 wt. part |
| Toluene | 6.0 wt. parts |

In accordance with the process of Example 1 except using the following monomer solution, a gel chloroprene polymer latex was produced.

| Monomer solution: | |
|---|---|
| Chloroprene | 98 wt. parts |
| Trimethylolpropane trimethacrylate | 2.0 wt. parts |
| 2,6-Di-t-butyl-p-cresol | 0.01 wt. part |

-continued

| Monomer solution: | |
|---|---|
| Diethyl xanthogendisulfide | 0.40 wt. part |

The resulting sol was mixed with the gel chloroprene polymer latex of Example 1 and the mixture was treated to obtain a gel/sol chloroprene polymer composition. The physical characteristics of the composition were measured by the method of Example 1. The results is shown in Tables 1 and 2.

EXAMPLE 4

In accordance with the process of Example 1 except blending uniformly the gel chloroprene polymer latex of Example 1 to the sol chloroprene polymer latex of Example 3, at a ratio of 25:75 of the gel chloroprene polymer: the sol chloroprene polymer and treating the mixture, a gel/sol chloroprene polymer composition was prepared.

In accordance with the method of Example 1, the physical characteristics of the composition and the vulcanized product were measured. The result is shown in Tables 1 and 2.

Reference A

In accordance with the process of Example 1 except adding 0.05 wt.part of n-dodecyl mercaptan, a sol chloroprene polymer was produced. The sol chloroprene polymer latex was blended to the gel chloroprene polymer latex of Example 1 and the mixture was treated by the method of Example 1 to obtain a gel/sol chloroprene polymer composition.

In accordance with the method of Example 1, the physical characteristics of the composition and the vulcanized product were measured. The result is shown in Tables 1 and 2.

Reference B

In accordance with the process of Reference A except adding 0.25 wt.part of n-dodecyl mercaptan, the polymerization and the treatment were repeated to obtain the gel/sol chloroprene polymer composition.

In accordance with the method of Example 1, the physical characteristics of the composition and the vulcanized product were measured. The result is shown in Tables 1 and 2.

Reference C

In accordance with the process of Example 1 except adding an additional n-dodecyl mercaptan at the time reaching the specific gravity of the latex to 1.056 (conversion of 64.8%), a sol chloroprene polymer was produced and a gel/sol chloroprene polymer composition was prepared.

In accordance with the method of Example 1, the physical characteristics of the composition and the vulcanized product were measured. The result is shown in Tables 1 and 2.

Reference D

In accordance with the process of Example 1 except adding no additional n-dodecyl mercaptan and adding the polymerization inhibitor at the time reaching the specific gravity of the latex to 1.067, a sol chloroprene polymer was produced and a gel/sol chloroprene polymer composition was prepared by blending with the gel chloroprene polymer of Example 1.

In accordance with the method of Example 1, the physical characteristics of the composition and the vulcanized product were measured. The result is shown in Tables 1 and 2.

Reference E

In accordance with the process of Example 3 except adding no additional diethyl xanthogendisulfide and adding the polymerization inhibitor at the time reaching the specific gravity to 1.067, a sol chloroprene polymer was produced and a gel/sol chloroprene polymer composition was prepared by blending to the gel chloroprene polymer of Example 3.

In accordance with the method of Example 1, the physical characteristics of the composition and the vulcanized product were measured. The result is shown in Tables 1 and 2.

TABLE 1

| Example or Reference | Exp. 1 | | Exp. 2 | | Exp. 3 | | Exp. 4 | | Ref. A | | Ref. B | | Ref. C | | Ref. D | | Ref. E | |
|---|---|---|---|---|---|---|---|---|---|---|---|---|---|---|---|---|---|---|
| gel or sol | sol | gel | sol | gel | sol | gel | sol | gel | sol | gel | sol | gel | sol | gel | sol | gel | sol | gel |
| Polymerization condition | | | | | | | | | | | | | | | | | | |
| Chloroprene (wt. part) | 100 | 98 | 92 | *1 | 100 | 98 | *2 | *1 | 100 | *1 | 100 | *1 | 100 | *1 | 100 | *1 | 100 | *2 |
| 2,3-Dichlorobutadiene (wt. part) | — | — | 8 | *1 | — | — | *2 | *1 | | | | | | | | | | |
| Trimethylolpropane trimethacrylate (wt. part) | — | .2 | — | *1 | — | 2 | *2 | *1 | | | | | | | | | | |
| n-Dodecyl mercaptan | | | | | | | | | | | | | | | | | | |
| Before polymerization (wt. part) | 0.220 | 0.200 | 0.230 | *1 | | | *2 | *1 | 0.220 | *1 | 0.220 | *1 | 0.220 | *1 | 0.220 | *1 | | *2 |
| Addition (wt. part) | 0.110 | — | 0.110 | *1 | | | *2 | *1 | 0.05 | *1 | 0.250 | *1 | 0.110 | *1 | — | *1 | | *2 |
| Diethyl xanthogendisulfide | | | | | | | | | | | | | | | | | | |
| Before polymerization (wt. part) | | | | | 0.45 | 0.40 | | | | | | | | | | | 0.45 | |
| Addition (wt. part) | | | | | 0.225 | | | | | | | | | | | | | |
| Polymerization temperature (°C.) | 40 | 40 | 40 | | 40 | 40 | | | 40 | | 40 | | 40 | | 40 | | 40 | |
| Result of polymerization | | | | | | | | | | | | | | | | | | |
| Conversion (%) | | | | | | | | | | | | | | | | | | |
| At time adding the | 54.3 | — | 56.0 | | 56.8 | — | | | 55.1 | | 55.5 | | 64.8 | | — | | | |

TABLE 1-continued

| Example or Reference | Exp. 1 | | Exp. 2 | | Exp. 3 | | Exp. 4 | | Ref. A | | Ref. B | | Ref. C | | Ref. D | | Ref. E | |
|---|---|---|---|---|---|---|---|---|---|---|---|---|---|---|---|---|---|---|
| gel or sol | sol | gel | sol | gel | sol | gel | sol | gel | sol | gel | sol | gel | sol | gel | sol | gel | sol | gel |
| regulator | | | | | | | | | | | | | | | | | | |
| Final conversion | 82.4 | 92.0 | 84.3 | | 83.5 | 95.0 | | | 82.5 | | 84.8 | | 81.7 | | 68.5 | | 69.4 | |
| Polymerization time (min) | 210 | 288 | 225 | | 218 | 330 | | | 205 | | 230 | | 210 | | 175 | | 200 | |

Note:
*1 the same as those of Example 1
*2 the same as those of Example 3

TABLE 2

| Example or Reference | Exp. 1 | Exp. 2 | Exp. 3 | Exp. 4 | Ref. A | Ref. B | Ref. C | Ref. D | Ref. E |
|---|---|---|---|---|---|---|---|---|---|
| Mooney viscosity (100° C.) | | | | | | | | | |
| Storage 0 day (5 min) | 49 | 50 | 50 | 52 | 72 | 38 | 60 | 48 | 47 |
| Storage 7 days | 52 | 52 | 49 | 54 | 96 | 50 | 75 | 53 | 55 |
| Extrusion characteristics | | | | | | | | | |
| Die swell (%) | 79 | 78 | 82 | 78 | 110 | 120 | 125 | 90 | 102 |
| Surface appearance (12 ratings) | 10 | 10 | 11 | 10 | 3 | 7 | 5 | 7 | 5 |
| Corner | 3 | 4 | 4 | 4 | 1 | 3 | 2 | 3 | 2 |
| Edge | 3 | 3 | 3 | 3 | 1 | 2 | 1 | 2 | 1 |
| Surface | 4 | 3 | 4 | 3 | 1 | 2 | 2 | 2 | 2 |
| Tensile characteristics | | | | | | | | | |
| Tensile strength (kg/cm$^2$) | 257 | 242 | 256 | 252 | 206 | 203 | 185 | 190 | 219 |
| Elongation (%) | 490 | 440 | 430 | 430 | 410 | 480 | 430 | 420 | 400 |
| 300% modulus (kg/cm$^2$) | 135 | 131 | 140 | 141 | 140 | 125 | 137 | 137 | 138 |
| Flexural characteristics | | | | | | | | | |
| Flexural times to reach 10 mm of cracking length | 2,000 | 2,500 | 2,500 | 3,000 | 600 | 1,000 | 900 | 1,500 | 1,000 |

In Table 2, it is clearly shown that the gel/sol chloroprene polymer compositions of the present invention had remarkably excellent storage stability.

The compositions of References A to E had large variations of Mooney viscosity in their storage and had inferior storage stability.

The vulcanized products obtained by the process of the present invention had excellent extrusion characteristics, tensile characteristics and flexural characteristics which are remarkably superior to those of References A to E.

What is claimed is:

1. In a chloroprene polymer composition consisting essentially of a benzene soluble chloroprene polymer (A) and a gel chloroprene polymer (B) in a ratio ranging from 20:1 to 1:1, the improvement comprising: said benzene soluble chloroprene polymer (A) being obtained by the aqueous emulsion polymerization of chloroprene or a mixture of chloroprene and from 1 to 20 weight %, based on the total monomer content, of an ethylenically unsaturated or conjugated diene comonomer with 0.05 to 5.0 weight % of a molecular weight regulator, said polymerization occurring by polymerizing said chloroprene or chloroprene-monomer mixture in the presence of a quantity of said molecular weight regulator, less than said above indicated amount, sufficient to prevent gel formation during polymerization until a conversion level of 40% to 60% is attained, and then adding to the partially polymerized reaction medium an additional quantity of molecular weight regulator in an amount of from 40% to 70% by weight the amount of molecular weight regulator originally mixed with the monomer and continuing said polymerization until a conversion in excess of 80% is attained; and the gel chloroprene polymer (B) being obtained by the aqueous emulsion polymerization of chloroprene or a mixture of chloroprene and from 0.1 to 10% by weight of an ethylenically unsaturated polyfunctional monomer.

2. The composition of claim 1, wherein the molecular weight regulator is selected from the group consisting of alkyl mercaptans having a $C_5$–$C_{16}$ alkyl group and dialkyl xanthogendisulfides having a $C_1$–$C_8$ alkyl group.

3. The composition of claim 1, wherein a latex of the benzene soluble chloroprene polymer (A) is blended with a latex of the gel chloroprene polymer (B) and the mixed latex so obtained is treated thereby resulting in the product chloroprene polymer composition.

4. The composition of claim 1, wherein said comonomer is 2,3-dichloro-1,3-butadiene, 2-cyano-1,3-butadiene, 1-chloro-1,3-butadiene, styrene, acrylonitrile or methyl methacrylate.

5. The composition of claim 1, wherein said polyfunctional monomer is ethylene glycol dimethacrylate, diethylene glycol dimethacrylate, or trimethylol propane trimethacrylate.

6. The composition of claim 1, wherein said polymerization reaction in which the benzene soluble chloroprene polymer component (A) is terminated after a conversion level in excess of 80% is achieved by the addition of a polymerization inhibitor to said polymerization medium.

7. The composition of claim 6, wherein said polymerization inhibitor is thiodiphenyl amine, 4-t-butyl catechol, 2,2′-methylene-bis-4-methyl-6-t-butyl phenyl or an alkylated diphenylamine.

8. The composition of claim 6, wherein said polymerization inhibitor is added to said polymerization reaction in an amount of 0.01 to 2.0 weight %.

9. The composition of claim 1, wherein the pH of the polymerization medium in which the benzene soluble chloroprene polymer (A) is prepared ranges from 7 to 13.

10. The composition of claim 1, wherein the polymerization medium for the synthesis of the benzene soluble chloroprene polymer (A) component contains an anionic or nonionic surface active agent.

* * * * *